Aug. 24, 1954
L. H. MORIN
2,687,260
SHROUDED SPOOL AND METHOD OF MAKING THE SAME
Filed Oct. 16, 1952
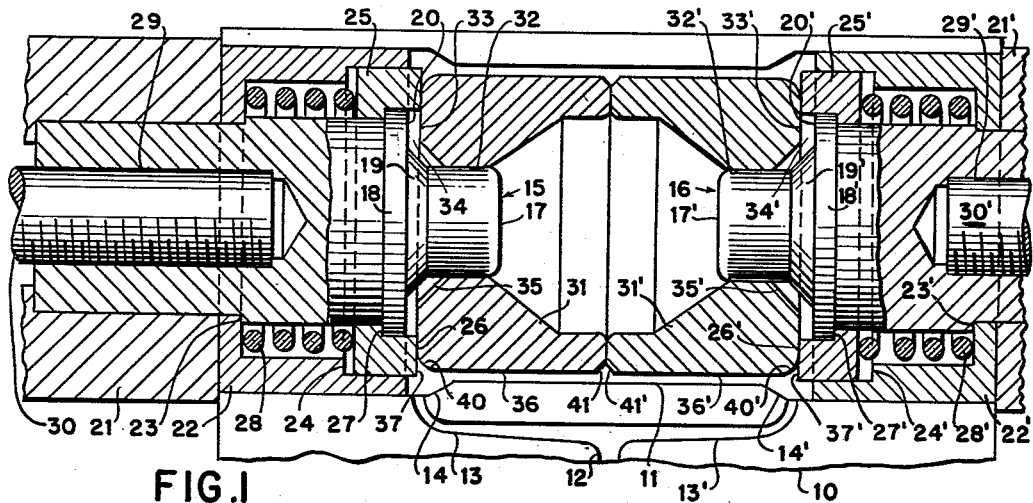
FIG.1
FIG.3
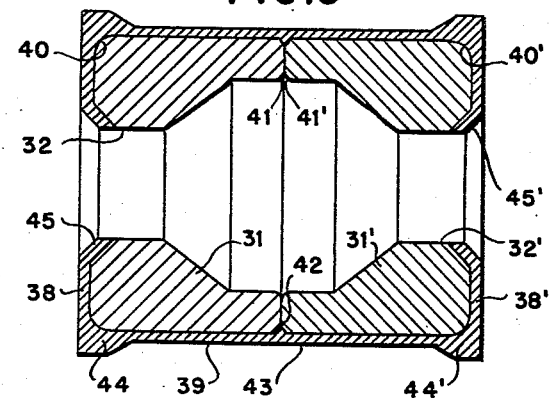
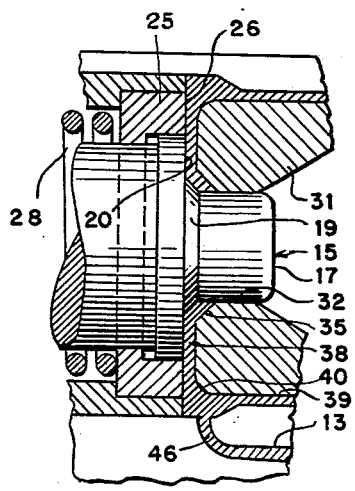
FIG.2
*INVENTOR.*
Louis H. Morin
BY
*ATTORNEY*

Patented Aug. 24, 1954

2,687,260

UNITED STATES PATENT OFFICE 2,687,260

SHROUDED SPOOL AND METHOD OF MAKING THE SAME

Louis H. Morin, Bronx, N. Y., assignor to Coats & Clark Inc., a corporation of Delaware Application October 16, 1952, Serial No. 315,139

9 Claims. (Cl. 242—119)

This invention relates to what I term shrouded spools, that is to say, a spool in which all of the outer surfaces are covered by a cast or moulded shroud or casing and, wherein, the cast or moulded casing is fashioned to form the flange ends of the spool. More particularly, the invention deals with a novel method of producing spools of the character described, wherein inserts or body members of the spool are supported and centralized within a mould cavity by cores having yieldable members exposed to the cavity and movable by the pressure injected moulding material to permit such material to flow to the surfaces of the inserts which are supported by the yieldable members, while maintaining the inserts centralized within the mould cavity.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a longitudinal view on the parting line of a pair of dies illustrating the several parts in position, preparatory to injection of material into the die cavity.

Fig. 2 is a view similar to Fig. 1 showing only a part of the construction and illustrating the injected material filling the die cavity, with parts in a different position; and Fig. 3 is a sectional view through a shrouded spool made according to my invention.

My invention deals with the production of spools or spool-like bodies, wherein it is desirable to completely cover or envelope an insert, or inserts, of a spool body with a cast or moulded shroud or casing and the problem which is confronted is the difficulty in applying the shroud or casing to the entire outer surfaces of the insert.

In the accompanying drawing, I have illustrated a novel method, by which the desired result can be obtained, namely by providing cores having biassed means or yieldable members which releasably engage surfaces of the insert to centralize it within the die or mould cavity and which are movable by the pressure-injected casting material to enable said engaged surfaces to be coated by the casting material. Preferably, the yieldable members or biassed means are in the form of spring-loaded members having surfaces which engage end surfaces of the insert. The surfaces of the members are at least partly exposed to contact with the molten casting material, the pressure of which is sufficient to move the members away from the insert end faces. Such contact may be established by providing members having portions projecting beyond the adjacent peripheral edges of the insert, as hereinafter described. Contact may also be established by making the members coextensive with said adjacent edges of the inserts, or even by making the members smaller, and then rounding or beveling the said edges of the insert to enable casting material to make contact with the member surfaces; in some cases, the porosity of the insert material is such as to permit casting material to seep through it from points on its sides adjacent said peripheral edges to its end faces.

In Fig. 1 of the drawing, I have indicated at 10 the face view of one die or mould having a cavity 11, having a gate or sprue passage 12 with runners 13, 13' extending to enlarged rim forming portions 14, 14' of the cavity. At 15 and 16 I have shown two similar cores, each comprising inner pin ends 17, 17' joining annular flanges 18, 18' in bevelled wall portions 19, 19'. Beyond the bevelled walls 19, 19' are core surfaces 20, 20'.

At 21, 21', I have shown the core slides for moving the cores 15 and 16 into and out of the cavity 11. At 22, 22' I have shown two shells or casings which seat on shoulder portions 23, 23' of the cores 15 and 16, the shells or casings having stop shoulders 24, 24' at their outer ends for limiting outward movement of a pair of spring loaded centralizing rings or members 25, 25'.

The members 25, 25' have surfaces 26, 26' which are adapted to be brought into alinement with the surfaces 20, 20' in the manner later described. The rings or members 25, 25' have shoulders 27, 27' which bear upon the annular flanges 18, 18' in the action of the springs 28, 28' on the rings or members 25, 25'.

The body portion of the cores 15 and 16 is internally threaded, as seen at 29, 29' to receive clamp screws shown, in part, at 30, 30', these screws serving to firmly support the cores 15 and 16, as well as the shells or casings 22, 22' on the core slides 21, 21'. Thus, these parts will move as a unit in the dies and in moving the pin 17, 17' into and out of the cavity 11.

At 31, 31' I have shown two inserts forming the body portion of the resulting spool or the product to be formed. These inserts are in the form of sleeve-like members to minimize the weight thereof. However, the outer ends of these members have bores 32, 32' of more or less standard-size, as commonly employed in thread spools and the core pins 17, 17' are adapted to fit in the bores 32, 32' to centralize the inserts 31, 31' with respect to the longitudinal axis, or the side surfaces, of the cavity 11. It will appear that the surfaces 26, 26' of the rings or members 25, 25' are extended by the springs 28, 28' beyond the surfaces 20, 20' to engage the ends 33, 33' of the inserts 31, 31', thus centralizing, or preventing longitudinal shifting of, said inserts with respect to end walls of the cavity, which end walls are defined by the surfaces 20, 20', the bevelled walls 19, 19', and the innermost annular end walls of shells 22, 22'.

This construction provides cavity spaces 34, 34' at the ends of the inserts 31, 31' and outwardly of the pins 17, 17'. In this connection, it will be noted that the bores 32, 32' of the inserts terminate in outer openings whose edges have annular bevelled walls 35, 35' which parallel the bevelled walls 19, 19', as seen in Fig. 1.

It will also appear from a consideration of Fig. 1 of the drawing that the diameter of the inserts 31, 31' is less than the diameter of the rings or members 25, 25', thus exposing part of the surfaces 26, 26', as indicated at 37, 37' to the cavity 11 so that, in the operation of pressure injecting material into the cavity 11, this material will engage the exposed surfaces 37, 37' and force the rings or members 25, 25' outwardly against the action of the springs 28, 28', allowing the injected material to extend into the spaces 34, 34' to provide the end portions 38, 38' on the shroud or casing 39, as clearly noted in Fig. 3. The position of one of the rings or members 25 at the completion of the pressure injection of the material is illustrated in Fig. 2 of the drawing, in which figure, only one ring, the ring 25, is shown, it being understood that the ring 25' of Fig. 1 is actuated in the same manner.

I also preferably round the outer peripheral edges of the inserts 31, 31', as indicated at 40, 40' to further facilitate extension of the injected material to the surfaces 26, 26'. However, it will be apparent that, as the material is injected into the cavity 11 and builds up in the enlarged rim forming portions 14, 14', sufficient pressure develops to force the rings or members 25, 25' outwardly, against the action of the springs 28, 28', to the limit of their outward movement. These springs will be loaded sufficiently to provide the desired operation in maintaining the centralization of the inserts.

In the aforesaid outward movement of the rings or members 25, 25' by the pressure injection of the material into the cavity 11, the rings strike the shoulders 24, 24' checking their outward movement and, thus, alining the surfaces 26, 26' with the surfaces 20, 20'. However, in some instances, it may be desirable to modify the position of the surfaces 26, 26' with respect to the surfaces 20, 20' and this can be done simply by controlling the positioning of the stop shoulder 24, 24' in the shells 22, 22'. It will also be apparent that the surfaces 26, 26', and/or 20, 20' may have any desired contour to characterize or ornament the end walls of the resulting shrouded spool.

I also preferably provide adjacent ends of the inserts 31, 31' with registering bevelled peripheral walls, as at 41, 41' which results in forming a reinforcing inwardly extending rib 42 centrally of the outer wall 43 of the spool. It will appear from a consideration of Fig. 3 of the drawing that the resulting shrouded spool will have enlarged and bevelled rim or flange portions 44, 44' at the ends thereof and that conically-shaped ends 45, 45' will extend from the walls 38, 38' into the apertures or bores 32, 32' which facilitates mounting of the resulting thread spool on the spindles of sewing machines and other similar mountings.

Further, the conical ends 45, 45' also facilitate engagement of the driving dog for rotating the spool in the application of winding threads on the spool in thread winding machinery.

It will be apparent that, after the shrouded spool has been formed in the cavity 11 in the manner illustrated in part in Fig. 2 of the drawing, the cores 15 and 16 are moved outwardly to clear the spool ends, after which the dies or moulds are separated to remove the shrouded spool from the dies or moulds, whereupon the gates 46, shown in part in Fig. 2, are trimmed from the rims 44, 44' thus producing the finished shrouded product.

Descriptively, the product is a hollow, light weight thread spool comprising a cylindrically-shaped body or insert having a longitudinally extending bore opening through both end faces and an annular bevelled wall defining the edge of each said opening. An integral shell, preferably of plastic material, completely encases the outer surfaces of the body and comprises a cylindrically-shaped part extending between end portions of the body, a flange part at each end portion comprising an exteriorly projecting rim, an apertured end part at each end face, and an annular bevelled part at each bevelled wall. Each flange part is solidly made of plastic material, being built up from the smooth cylindrical surfaces of the barrel-like body. Each bevelled part extends to the bore of the body and forms a portion of the surface of the bore adjacent each opening. The rims are slittable to provide non-chippable thread-holding nicks.

As may be appreciated, the insert body may be in the form of one piece as well as a pair of halves as shown. It may be made of wood or may be a molded product formed from any suitable molding composition, an example of the latter being described in U. S. Patent 2,463,044. The molding composition may have a wood, paper, textile, or inorganic type filler.

It will be understood that, while for purposes of illustrating one adaptation and use of my invention I have shown the application of a shroud or casing to a spool, other products can be produced in a similar manner and, while it is preferred that spools of the kind under consideration be enveloped or shrouded with a plastic material, such as the conventional thermoplastics adaptable for pressure injection in a heated state into the cavity of a die or mould, metal casings or shrouds can be applied to spools or other articles in accordance with the teachings in the method herein disclosed.

Having fully described my invention, what I claim as new and desire to secure by Letters Patent is:

1. A shrouded spool of the character defined, comprising a hollow body portion having common diameter bores at opposed ends, a one-piece moulded shroud covering outer surfaces of said body, said shroud having integral projecting rims at opposed ends, the bores of said body having conical outer ends, and said shroud having portions overlying said conical ends and with apertures registering with and in alinement with the bores of said body.

2. A shrouded spool of the character defined, comprising a hollow body portion having common diameter bores at opposed ends, a one-piece moulded shroud covering outer surfaces of said body, said shroud having integral projecting rims at opposed ends, the bores of said body having conical outer ends, said shroud having portions overlying said conical ends and with apertures registering with and in alinement with the bores of said body, and the central portion of said shroud having an inwardly extending reinforcing rib.

3. The herein described method of producing shrouded articles of manufacture of the character defined, which comprises centralizing an insert body axially of a mould cavity of a pair of dies by a pair of relatively movable cores having portions adapted to extend into said cavity, arranging on each of said cores a spring-loaded member normally exposed to said cavity and engaging end walls of said body to centralize said body longitudinally of said cavity, exposing part of said members to the cavity beyond the limits of said body, then pressure injecting heated material into the cavity to form, upon exposed surfaces of said body, a shroud, moving said members away from said body in extending said material onto end surfaces of the body in the formation of said shroud, then withdrawing the cores from said body and shroud, separating the dies to remove the shrouded article therefrom, and then trimming said article.

4. The herein described method of producing shrouded spools, which comprises supporting a pair of hollow spool insert bodies on a pair of opposed relatively movable cores within and spaced with respect to the walls of a cavity of a pair of dies, utilizing said cores to centralize the insert bodies axially with respect to said cavity, arranging a pair of spring-loaded members movable on said cores and tensioned to extend into the cavity and engage end surfaces of said insert bodies to centralize said bodies within the cavity, then pressure injecting material into the die cavity and moving said spring-loaded members outwardly with respect to said insert bodies in forming a shroud enveloping outer surfaces of said bodies, then separating the dies in removal of the shrouded spool therefrom, and then trimming the spool in forming the finished product.

5. Method of making plastic-coated thread spools which comprises positioning a hollow-bore cylindrically-shaped insert in the cavities of a pair of relatively movable mating dies, closing the dies about the insert, supporting the insert in transversely spaced relation to side surfaces of the cavity by engaging the bore at each end of the insert, coincidently therewith releasably engaging end faces of the insert to longitudinally space the latter relatively to end surfaces of the cavity, pressure-injecting molten plastic material to said cavity to form a coating on the cylindrical surfaces of the insert, including forming a flange part at each end portion of said coating, said end face engagement of the insert serving to prevent lateral or longitudinal shifting of the insert within the cavity during said injection step, coincidently freeing the insert from said end face engagement by utilizing the pressure of the molten plastic to release said engagement, thereby enabling molten plastic to flow to the spaces adjacent the end faces of the insert and to coat said faces, then disengaging the bores of the insert, opening the dies, and removing the plastic-coated thread spool.

6. A hollow, light weight thread spool comprising a cylindrically-shaped body having a longitudinally extending bore opening through both end faces thereof, an annular bevelled wall defining the peripheral edge of each said opening, an integral plastic shell completely encasing the outer surfaces of said body, said shell comprising a cylindrically-shaped part extending between end portions of the body, a flange part at each said end portion comprising an exteriorly projecting rim, an apertured end part at each said end face, and an annular bevelled part at each said bevelled wall, each said bevelled part extending to said bore and forming a portion of the surface of the bore adjacent said opening, and each said rim being slittable to provide a non-chippable thread-holding nick.

7. Method of making a plastic-coated thread spool which comprises supporting a pair of hollow bores, abutting inserts in the cavity of a pair of closed, relatively movable mating dies, supporting the inserts in transversely spaced relation to side surfaces of the cavity by engaging the bore at the free ends of the abutting inserts, coincidently therewith releasably engaging the free end faces of the inserts to space the latter relatively to end surfaces of the cavity, pressure-injecting molten plastic material to said cavity to form a coating on the inserts, including the forming of end flanges, said end face engagement of the inserts serving to prevent longitudinal shifting of the inserts within the cavity during said injection step, coincidently freeing the inserts from said end face engagement by utilizing the pressure of the molten plastic to release said engagement, thereby enabling molten plastic to flow to the spaces adjacent the free end faces of the inserts and to coat said faces, coincidently with said coating step forming an inwardly directed, plastic reinforcing rib along the line of abutment of said inserts, then disengaging the bores of the inserts, opening the dies, and removing the plastic coated thread spool, said plastic coating serving to hold said inserts together in permanent abutting relation.

8. Method of making a plastic-coated thread spool which comprises supporting an insert in the cavity of a pair of closed, relatively movable mating dies in spaced relation to side surfaces of said cavity, coincidently therewith releasably engaging the end faces of the insert to space the latter relatively to end surfaces of the cavity, pressure-injecting molten plastic material to said cavity to form a coating on the insert, including a flange part at each end portion thereof, said end face engagement of the insert serving to prevent longitudinal shifting of the insert within the cavity during said injection step, coincidently freeing the insert from said end face engagement by utilizing the pressure of the molten plastic to release said engagement, thereby enabling molten plastic to flow to the spaces adjacent the end faces of the insert and to coat said faces, then opening the dies, and removing the plastic coated thread spool therefrom.

9. A hollow, light weight thread spool comprising a pair of transversely abutting inserts each having a longitudinally extending bore opening through both ends thereof, an annular bevelled wall defining the edge of the opening in each free end face of said inserts, an integral plastic shell completely encasing the outer surfaces of said abutting inserts, said shell comprising a part extending between free end portions of the abutting inserts and having an inwardly directed, reinforcing rib along the line of abutment of said inserts, a flange part at each said end portion comprising a projecting rim, an apertured end part at each said free end face, and an annular bevelled part at each said bevelled wall.

References Cited in the file of this patent

UNITED STATES PATENTS

| Number | Name | Date |
|---|---|---|
| 185,864 | McMillan | Jan. 2, 1877 |
| 1,981,771 | Benge | Nov. 20, 1934 |
| 2,465,799 | Gravesen | Mar. 29, 1949 |
| 2,559,861 | Fay | July 10, 1951 |

FOREIGN PATENTS

| Number | Country | Date |
|---|---|---|
| 380,308 | Great Britain | Sept. 15, 1932 |